United States Patent [19]

McNeel

[11] 4,122,433
[45] Oct. 24, 1978

[54] FLUID TIGHT GEOPHONE CASE

[75] Inventor: William O. McNeel, Houston, Tex.

[73] Assignee: Geo Space Corporation, Houston, Tex.

[21] Appl. No.: 799,360

[22] Filed: May 23, 1977

[51] Int. Cl.² .................................................. G01V 1/16
[52] U.S. Cl. ............................................................ 340/17 R
[58] Field of Search ........................ 340/17 R; 29/594; 174/52 R, 52 S

[56] References Cited

U.S. PATENT DOCUMENTS

| 3,930,218 | 12/1975 | Hall, Jr. ............................ | 340/17 R |
| 3,931,453 | 1/1976 | Hall, Jr. ............................ | 340/17 R |
| 3,956,575 | 5/1976 | Sutherland ........................ | 340/17 R |

*Primary Examiner*—Nelson Moskowitz
*Assistant Examiner*—T. M. Blum
*Attorney, Agent, or Firm*—Daniel J. Meaney, Jr.

[57] ABSTRACT

A fluid tight geophone case having a case nose having an interior cavity for receiving the geophone to be enclosed and a mounting means for receiving an elongated spike wherein the case nose includes a threaded collar and indentation in the collar for receiving a first O-ring seal, a case top which is tapered having a hollowed-out central area, a small passageway at the top which is a restriction in the form of a cone with base directed toward the central area and a large opening at the bottom which is internally threaded to mate with the case nose and having a slot to receive the first O-ring seal, a tapered compression cone having thin side walls, a small tapered end having an aperture which is formed in an inverted cone forming a grommet cavity with the passageway of the cone, a shaped cavity in the interior of the compression cone and a large opening at the other end with an annular shaped slot formed around the outer periphery of the end to receive a second O-ring seal and a yieldable grommet located in the grommet cavity to clamp and seal against a cable passing through the grommet passageway is shown.

8 Claims, 11 Drawing Figures

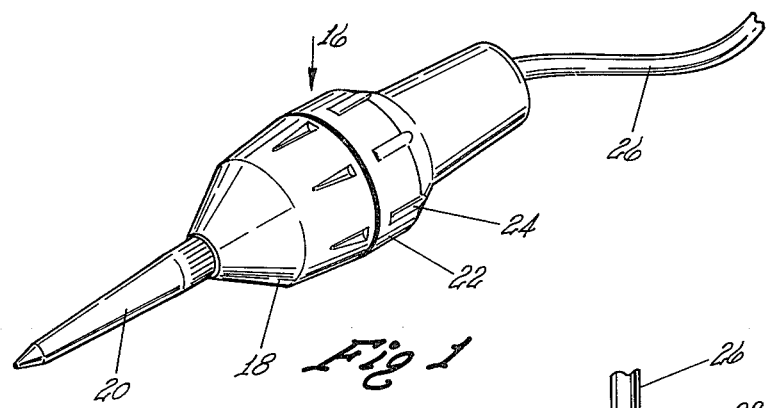
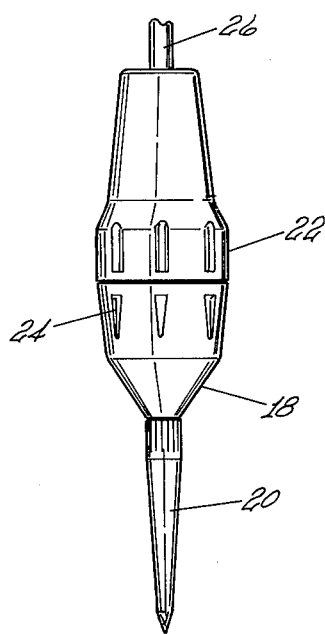
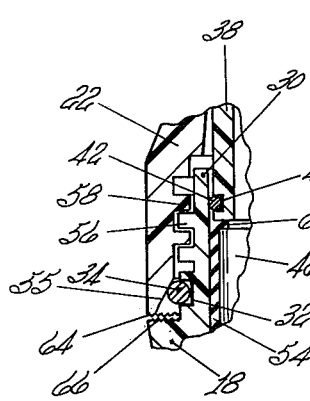
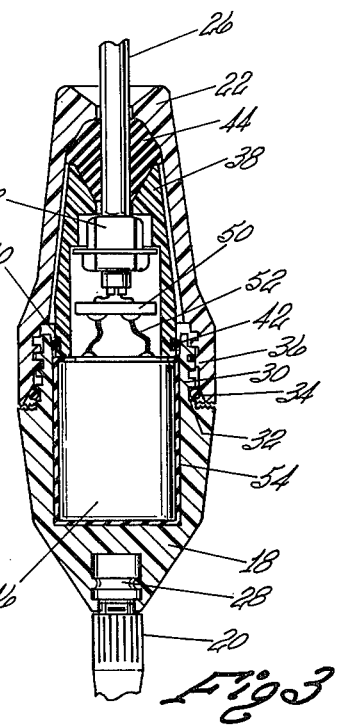
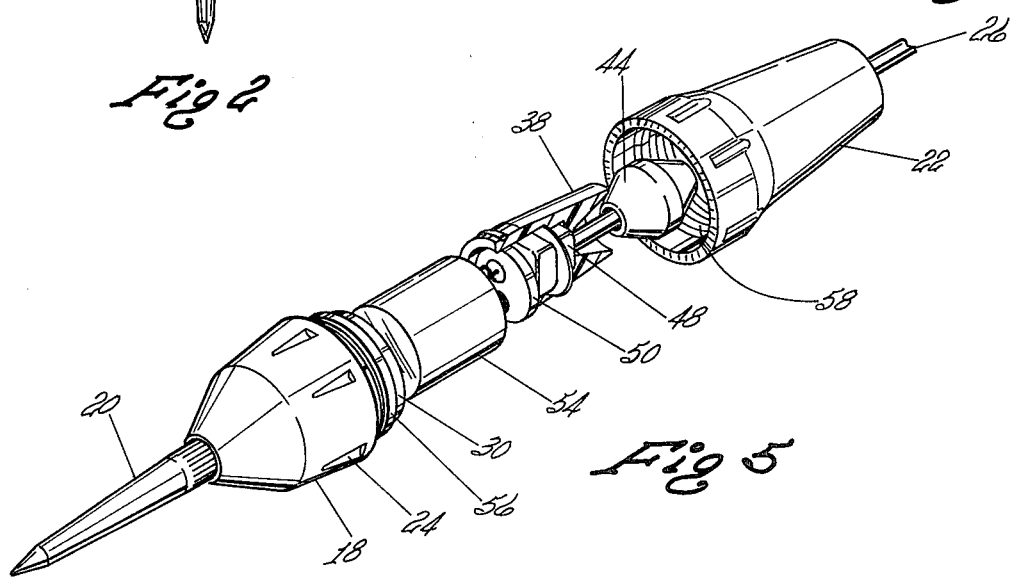

FLUID TIGHT GEOPHONE CASE

BACKGROUND OF THE INVENTION

1. Field of the Invention

This invention relates to a novel and improved fluid tight sensor case and specifically to a fluid tight geophone case for use with a cable attached to a geophone wherein the cable is clamped within the case and is electrically connected to terminals on a geophone and the entire assembly of cable, geophone and case is fluid tight.

This invention has utility in the geophysical industry. Electrical cables with sensors, such as geophones, electrically connected thereto are used in seismic acquisition systems for generating and recording seismic data. The use of geophones in a wet or humid environment is required. Such environments include surface water, puddles, swamps, marsh lands or the like. The use of the fluid tight geophone case with an electrical cable and geophone results in a fluid tight assembly which prevents fluid from entering into the cable orifice, the case nose, and case top and into disruptive contact with the interior of the geophone case.

2. Disclosure of the Prior Art

It is known in the prior art to utilize fluid tight cases for electrical cable and geophone assemblies. One known prior art device is a Fluid-Tight Enclosure for Geophone and Cable disclosed in U.S. Pat. No. 3,993,859, wherein a flexible header, stress ring and housing form a fluid tight seal around a cable which passes through the flexible header and is electrically connected to the geophone. Other known prior art devices utilize threaded plastic members having O-ring seals and sealing means surrounding the cable which passes therethrough to form a fluid tight seal.

SUMMARY OF THE INVENTION

The present invention overcomes certain of the disadvantages of the prior art devices. In U.S. Pat. No. 3,993,859 and other known devices, the electrical cable to be connected to the sensor, such as a geophone, need only enter the case through one opening. The prior art devices usually have a cable pass therethrough.

Another disadvantage of the prior art devices is that fluid, such as water, may enter the cable, travel along the twisted pair electrical conductors within the interior of the cable skin, and ultimately into the case. In such event, the fluid may disrupt or otherwise damage the geophone by shorting across the terminals thereof or between the electrical conductors of the cable.

The present invention discloses a ruggedized, fluid tight sensor case adapted for use with a cable and geophone wherein the cable enters the case and is electrically connected to the geophone.

One advantage of the present invention is that the fluid tight geophone case includes a grommet which has an aperture for passing the cable therethrough when the grommet is in a natural, unstressed state. In use, the grommet is subjected to stress which intimately engages the cable and which, in turn, urges the cable covering or sheath into fluid tight engagement with the electrical conductors to prevent fluid migration through the cable into the case.

Another advantage of the present invention is that four seals are utilized to maintain the integrity of the seal during use.

Yet another advantage of the present invention is that the case can be disasssembled in the field, a defective geophone can be repaired or replaced and the case can be reassembled and placed back into service.

BRIEF DESCRIPTION OF THE DRAWING

The foregoing and other advantages and features of the invention will become apparent from the following description of the preferred embodiment when considered together with the illustration in the accompanying drawing which includes the following figures:

FIG. 1 is a perspective view of an assembled fluid tight geophone case with an electrical cable entering therein;

FIG. 2 is a front view of the assembled fluid tight geophone case with cable;

FIG. 3 is a partial front sectional view of a fluid tight geophone case, cable and geophone assembly;

FIG. 4 is an enlarged partial section front view of the fluid tight geophone case showing the sealing relationship between the case nose, case top, compression cone and two O-rings;

FIG. 5 is an exploded perspective view showing the relationship between the fluid tight geophone case of FIG. 1 with the cable and geophone electrically connected;

DESCRIPTION OF THE PREFERRED EMBODIMENT

Figure 6:
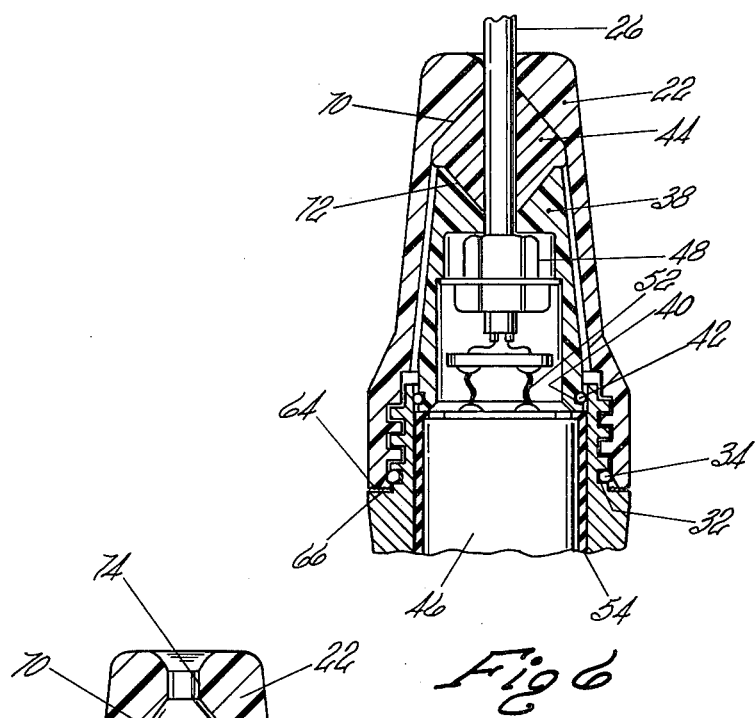
FIG. 6 is an exploded partial sectional front view of the fluid tight geophone case showing the four seals.

FIGS. 1 and 2 illustrate an assembled fluid tight sensor case, generally shown by arrow 16, which, in the preferred embodiment, is a fluid tight geophone case. The fluid tight geophone case 16 has a housing means, such as case nose 18, having a means for attaching a mounting device at an outer extremity of the case nose, such as an elongated spike 20. The fluid tight geophone case has a cover, such as tapered case top 22, having small gripping grooves 24 therearound, and a cable 26 entering therethrough at the end thereof.

FIG. 3 shows the details of the various elements of an assembled fluid tight geophone case with cable and geophone. Case nose 18 has an opening at one end thereof and a central open area communicating therewith. The case nose 18 has a ring-shaped collar 30 affixed to the periphery of the opening. The collar 30 has an annular-shaped indentation 32 around the outer edge of the opening. The collar 30 has a threading means, shown in FIG. 4, extending axially around the exterior surface of the collar 30. An O-ring seal 34 is positioned in the annular shaped indentation 32 of the case nose 18. The case top 22 has a large open end 36, the end of which engages the O-ring seal 34. This is shown in greater detail in FIG. 4.

Figure 8:
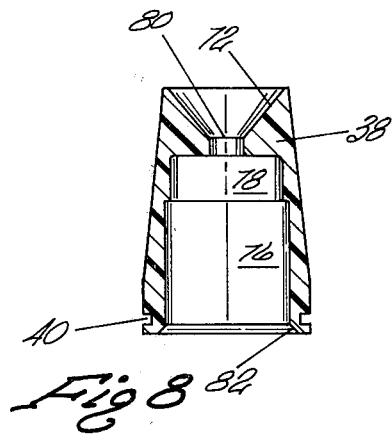
FIG. 8 is a sectional front view of the compression cone.

A compression cone 38 is positioned within the hollowed-out central area of the case top 22. The compression cone 38 has a large and a small end and means defining a shaped cavity extending from the small end to the large end. The details of the compression cone 38 are shown in FIGS. 6 and 8. The large end of the compression cone 38 has an annular-shaped slot 40 extending circumferentially around the otuer surface thereof. An O-ring seal 42 is located in the annular-shaped slot 40.

Each of the surfaces near the tapered top end of the case top 22 and compression cone 38 are conical shaped, and are positioned relative to each other to form a double end grommet cavity for a grommet 44.

A geophone 46 is positioned in the central open area of case nose 18. A stress relief means, such as clamp 48, is mechanically attached to cable 26. The electrical conductors of cable 26 are electrically connected to an insulating support means, such as electrical terminal connector 50, having a pair of terminals thereon. Electrical conducting means, such as conductors 52, extend from the terminals of terminal connector 50 to geophone 46. A rubber cover 54 is located between the geophone 46 and interior surface of the central area of case nose 18.

FIG. 4 shows in detail three of the seals made in the vicinity of the threaded case nose 18 and case top 20. The case nose 18 is shown to have the annular shaped indentation 32 located around the outer edge surface of the collar 30, at the juncture where the collar is affixed to the case nose 18. The case top 22 has a slotted ridge 55 in the interior surface of the thin outer wall thereof. The O-ring seal 34 is compressed in sealing engagement between indentation 32 and slotted ridge 55. The case nose 18 has a threading means such as rectangular shaped threads 56, extending axially around the exterior surface of the collar 30.

Similarly, case top 22 has a threading means, such as rectangular shaped threads 58, extending axially around the interior surface adjacent the large opening 36. The threads 56 on case nose 18 and threads 58 on case top 22 are adapted to engage and cooperate with each other to advance and form a threaded integral unit therebetween as the case nose 18 and case top 22 are rotated relative to each other in a selected direction, such as for example, illustrated in FIG. 11.

Figure 11:
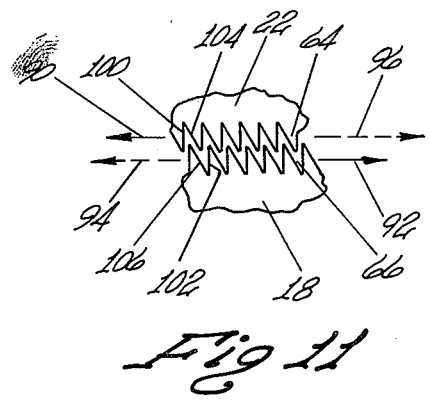
FIG. 11 is a pictorial representation of the serrated teeth on the case top and case nose illustrating the sliding and locking action in response to rotational forces.

The case nose 18 has serrated teeth 66 mounted in a circular pattern around the periphery of the opening on the edge of the case nose 18 adjacent the exterior surface of collar 30. The serrated teeth 66 have points directed toward the selected direction of rotation, as shown in FIG. 11.

The case top 22 has serrated teeth 64 mounted in a circular pattern around the periphery of the edge of the case top 22 located adjacent the threads 56. The serrated teeth 64 have points directed toward the selected direction of rotation, as shown in FIG. 11. The serrated teeth 64 and 66 operate to slideably engage and slide over each other as the threads 56 and 58 advance the case nose 18 and case top 20 together. A force in a direction other than the selected direction cause the serrated teeth 64 and 66 to lock, as illustrated in FIG. 11.

The compression cone 38 has its annular shaped slot 40 located behind the inner surface of the collar 30. The O-ring seal 42 is located and forms a seal therebetween.

The rubber cover 54 has a lip 58 which is squeezed between the edge of compression cone 38 and the top of geophone 46. The rubber cover 54 may be formed of any similar insulating material.

FIG. 5 shows the relationship between a two conductor cable 26 and geophone 46, with rubber cover 54.

The nose case 18, geophone 46, terminal connector 50, stress relief clamp 48, compression cone 38, grommet 44 and case top 22, are in axial alignment. Threads 56 and 58 on case nose 18 and case top 22, respectively, cooperate to form an integral unit with all the components.

FIG. 6 shows in greater detail the construction and relationship between the small passageway in case top 22, the small tapered end with an aperture in compression cone 38 and grommet 44. The case top 22 has a sloping wall 70 which defines one conical shaped surface. The compression cone 38 likewise has a sloping wall 72. The grommet 44 is stressed between walls 70 and 72, causing the grommet to urge the cable covering tightly against the electrical conductors with cable 26.

Figure 7:
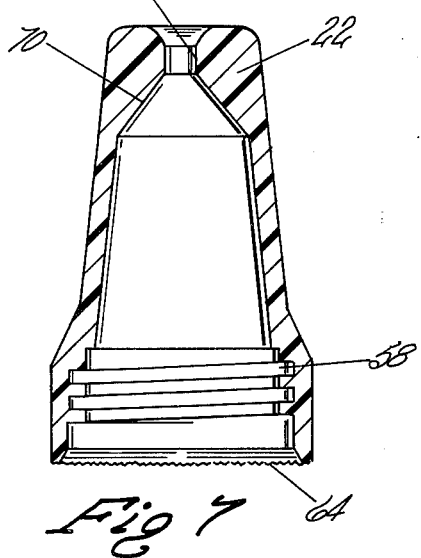
FIG. 7 is a sectional front view of the case top.

FIG. 7 shows case top 22 having a tapered thin outer wall, a large opening having the threads 58 at one end thereof, a small passageway 74 axially aligned with the opening at the other end thereof and the hollowed-out central area formed therein. The passageway 74 is formed by an annular-shaped restriction defining the conical-shaped interior surface having the sloping wall 70 extending interior from the passageway 74 to the inner surface of the thin outer wall. In the preferred embodiment, the sloping wall is about 50° relative to a horizontal plane passing through the case top 22.

FIG. 8 shows the tapered compression cone 38 having a thin outer wall, a large tapered end 82, a small tapered end having means defining an aperture 80 and a conical-shaped surface therearound with the sloping wall 72 extending from the aperture 80 to the inner surface of the compression cone 38 side wall. In the preferred embodiment, the sloping wall 72 is about 40° relative to a horizontal plane passing through compression cone 38.

The side walls of compression cone 38 define a shaped cavity extending from the small tapered end having aperture 80 to the large tapered end 82 having annular-shaped slot 40. The cavity includes section 76 which is a larger cross-section and a second section 78 having a smaller cross-section to form a ledge to cooperate with clamp 48, as shown in FIG. 6.

Figure 9:
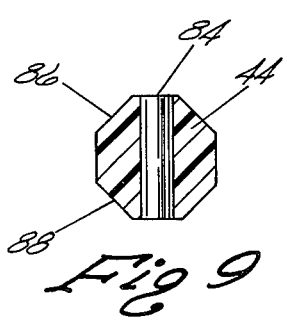
FIGS. 9 and 10 are sectional views of the grommet showing the general shape thereof in its natural state and stressed state, respectively.

FIG. 9 shows the yieldable grommet 44 having an aperture 84 extending axially therethrough. The diameter of aperture 84 is selected relative to the diameter of the cable 26, of FIG. 6, to form a snug fit when grommet 44 is in its natural state. The grommet 44 in its natural or unstressed state is generally in the form of a double ended cone having inverted sloping walls 86 and 88. In the preferred embodiment, the angle of the slope is about 45° relative to a horizontal plane passing through the grommet 44.

Figure 10:
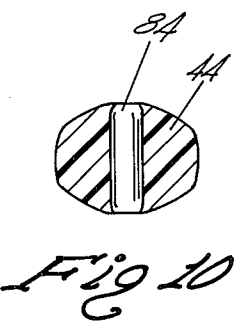

FIG. 10 shows diagrammatically the shape of the grommet 44 in its stressed state; that is, when it is compressed between conically surfaces 70 and 72, as shown in FIG. 6. Concurrently, the diameter of aperture 84 is reduced causing the sealing action with cable 26, also as shown in FIG. 6.

FIG. 11 illustrates diagrammatically the relationship between serrated teeth 66 on case nose 18 and serrated teeth 64 on case top 22. Serrated teeth 64 and 66 each have a sawtooth shape having a sloping portion 104 and 106 and straight portions 100 and 102. The teeth point toward a selected direction of rotation as shown by arrows 90 and 92. When the case nose 18 is rotated relative to case top 22 in the direction of arrows 90 and 92, the sloping surfaces 104 and 106 of teeth 64 and 66, respectively, slideably engage and slide over the teeth. If the case nose 18 and case top 22 are subjected to a rotational force other than in the selected direction, such as the opposite direction shown by dashed arrows 94 and 96, the straight portions 100 and 102 of teeth 64 and 66, respectively, lock against each other to restrict easy disassembly of the unit. Of course, with a sufficiently strong force, the teeth slip relative to each other to permit disassembly.

What is claimed is:

1. A fluid tight sensor case comprising means defining a housing having an opening at one end thereof and a central open area communicating with said opening for receiving a sensor, said housing including a ring-shaped collar affixed to the periphery of said opening, said collar having an annular-shaped indentation around the outer edge surface thereof and including threading means extending axially around the exterior surface of the collar, said housing means further including serrated teeth mounted in a circular pattern around the periphery of said opening on the edge of said housing adjacent the exterior surface of said collar, said serrated teeth having points directed toward the selected direction of rotation;

a cover having an opening at one end thereof, a small passageway axially aligned with the opening at the other end thereof and an axially extending hollowed-out central area extending between said opening and said passageway, said cover having the passageway formed by means defining a conical-shaped interior surface wherein the sloping wall thereof extends interior from the passageway, said cover including means for defining a slotted ridge in the interior surface of the outer wall at the inner end defining the opening and threading means extending axially around the interior surface adjacent the opening adapted to engage and cooperate with the threading means on the exterior surface of said collar to advance and form a threaded integral unit therebetween as the housing and cover are rotated relative to each other in a selected direction, said cover further including serrated teeth mounted in a circular pattern around the periphery of the edge of the cover located adjacent the threading means, said serrated teeth having points directed toward the selected direction of rotation, said serrated teeth on said housing being operative to slideably engage and slide over the teeth on said cover as said housing and cover are rotated relative to each other in the selected direction and to lock against each other as the housing and cover are rotated relative to each other in a direction other than in said selected direction;

a compression cone positioned within the hollowed-out central area of said cover and having a large end, a small end and means defining a shaped cavity extending from the small end to the large end, said compression cone including means defining an aperture at said small end and a conical-shaped surface therearound with the sloping wall thereof positioned in a spaced opposed relation to the conical shape inner surface of said cover defining an interior grommet cavity having a shape generally in the form of a double ended cone;

a yieldable grommet having an aperture extending axially through the center thereof and a natural shape generally in the form of a double ended cone positioned in the grommet cavity formed between the cover and compression cone; and an O-ring seal located between the annular-shaped indentation of the housing and slotted ridge of said cover; said grommet being responsive to the threading and advancing of said teeth means of said cover and said housing as the same are rotated in said selected direction to compress said grommet between the conically-shaped side walls.

2. The fluid tight sensor case of claim 1 comprising a second O-ring seal located between the annular-shaped slot of the compression cone and inner surface of the collar.

3. The fluid tight sensor case of claim 1 wherein said housing means further includes means for attaching a mounting device at an exterior outer extremity of the housing at the end opposite the opening.

4. A fluid tight sensor case comprising means defining a housing having an opening at one end thereof and a central open area communicating with said opening for receiving a sensor, said housing including a ring-shaped collar affixed to the periphery of said opening, said collar having an annular-shaped indentation around the outer edge surface thereof and including threading means extending axially around the exterior surface of the collar;

a cover having an opening at one end thereof, a small passageway axially aligned with the opening at the other end thereof and an axially extending hollowed-out central area extending between said opening and said passageway, said cover having the passageway formed by means defining a conical-shaped interior surface wherein the sloping wall thereof is about 50° and extends interior from the passageway, said cover including means for defining a slotted ridge in the interior surface of the outer wall at the inner end defining the opening and threading means extending axially around the interior surface adjacent the opening adapted to engage and cooperate with the threading means on the exterior surface of said collar to advance and form a threaded integral unit therebetween as the housing and cover are rotated relative to each other in a selected direction;

a compression cone positioned within the hollowed-out central area of said cover and having a large end, a small end and means defining a shaped cavity extending from the small end to the large end, said compression cone including means defining an aperture at said small end and a conical-shaped surface therearound with the sloping wall thereof positioned in a spaced opposed relation to the conical shape inner surface of said cover defining an interior grommet cavity having a shape generally in the form of a double ended cone;

a yieldable grommet having an aperture extending axially through the center thereof and a natural shape generally in the form of a double ended cone positioned in the grommet cavity formed between the cover and compression cone; and an O-ring seal located between the annular-shaped indentation of the housing and slotted ridge of said cover; said grommet being responsive to the threading and advancing of said teeth means of said cover and said housing as the same are rotated in said selected direction to compress said grommet between the conically-shaped side walls;

a cable having at least two electrical conductors extending through the small passageway of the cover, through the aperture in the grommet and through the small end of the compression cone into the shaped cavity of the compression;

a geophone having a pair of output terminals positioned in said central open area of the housing means;

strain relief means rigidly attached to the cable and located within the shaped cavity of the compression, said strain relief means including means for engaging the side walls of the shaped cavity to hold the cable in position in response to a force applied to the cable in a direction pulling the cable out of the case;

insulating support means located within the shaped cavity of the compression cone and having a pair of terminals, said insulating means having said terminals connected to said electrical conductors; and electrical conducting means extending from the terminals of the geophone to the terminals on the insulating support means.

5. The fluid tight sensor case of claim 4 further comprising
an insulator located between the exterior of the geophone and the interior of the central open area of the housing means.

6. The fluid tight sensor case of claim 4 wherein said compression cone small end aperture defining means defines the sloping wall to be about 40°.

7. The fluid tight sensor case of claim 4 wherein said grommet sloping side walls are about 45°.

8. A fluid tight, geophone case comprising
a case nose having an opening at one end thereof and a central open area extending axially therefrom interior the case nose for receiving a geophone, said case nose including a ring-shaped collar affixed to the periphery of said opening, said collar having an annular-shaped indentation around the outer edge surface thereof at the juncture where the collar is affixed to the nose cone, said case nose including threading means extending axially around the exterior surface of the collar and means for attaching a mounting device at an outer extremity of said case nose at the other end thereof, said case nose further including serrated teeth mounted in a circular pattern around the periphery of said opening on the edge of said case nose adjacent the exterior surface of said collar, said serrated teeth having points directed toward the selected direction of rotation;

an elongated case top having a tapered thin outer wall, a large opening at one end thereof, a small passageway axially aligned with the large opening at the other end thereof and an axially extending hollowed-out central area extending between said opening and said passageway, said case top having the passageway formed by an annular-shaped restriction defining a conical-shaped interior surface wherein the sloping wall thereof extends interior from the passageway to the inner surface of the thin outer wall, said case top including means for defining a slotted ridge in the interior surface of the thin outer wall at the inner end defining the opening and threading means extending axially around the interior surface adjacent the opening adapted to engage and cooperate with the threading means on the exterior surface of said collar to advance and form a threaded integral unit therebetween as the case nose and case top are rotated relative to each other in a selected direction, said case top further including serrated teeth mounted in a circular pattern around the periphery of the edge of the case top located adjacent the threading means, said serrated teeth having points directed toward the selected direction of rotation, said serrated teeth on said case nose being operative to slideably engage and slide over the teeth on said case top as said case nose and case top are rotated relative to each other in the selected direction and to lock against each other as the case nose and case top are rotated relative to each other in a direction other than in said selected direction;

a tapered compression cone having a thin outer wall positioned within the hollowed-out central area of said case top, said compression cone having a larger tapered end, a small tapered end, and means defining a shaped cavity extending from the small tapered end to the large tapered end, said compression cone including means defining an aperture at said small tapered end and a conical-shaped surface therearound with the sloping wall thereof extending from the aperture at the small end to the inner surface of the compression cone side wall positioned with said sloping wall in a spaced opposed relation to the conical shape inner surface of said case top and cooperating therewith defining an interior grommet cavity having a shape generally in the form of a double ended cone, said case top defining at the large tapered end, an annular-shaped slot extending axially around the edge of the outer surface thereof;

a yieldable grommet having an aperture extending axially therethrough and having a natural shape generally in the form of a double ended cone positioned in the grommet formed between the case top and compression cone;

a first O-ring seal located between the annular-shaped indentation of the case nose and slotted ridge of said case top; and a second O-ring seal located within said annular-shaped slot of said compression cone and the inner surface of the collar of said nose top, said grommet being responsive to threading and advancing of said teeth means of said case top and said case nose as the same are rotated in said selected direction to compress said grommet between the conically-shaped side walls.

* * * * *